United States Patent
Chen et al.

(10) Patent No.: US 11,586,103 B2
(45) Date of Patent: Feb. 21, 2023

(54) ILLUMINATION SYSTEM AND PROJECTION APPARATUS

(71) Applicant: Coretronic Corporation, Hsin-Chu (TW)

(72) Inventors: Shang-Wei Chen, Hsin-Chu (TW); Yen-Mo Yu, Hsin-Chu (TW); Hsuan-I Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 87 days.

(21) Appl. No.: 17/168,154

(22) Filed: Feb. 4, 2021

(65) Prior Publication Data
US 2021/0247677 A1      Aug. 12, 2021

(30) Foreign Application Priority Data
Feb. 10, 2020    (CN) .......................... 202020157627.9

(51) Int. Cl.
  *G03B 21/20*     (2006.01)
  *G02B 27/10*     (2006.01)
  *G02B 27/14*     (2006.01)

(52) U.S. Cl.
  CPC ....... *G03B 21/208* (2013.01); *G02B 27/1046* (2013.01); *G02B 27/145* (2013.01); *G03B 21/204* (2013.01); *G03B 21/2066* (2013.01)

(58) Field of Classification Search
  CPC ............ G02B 27/1026; G02B 27/1046; G02B 27/141; G02B 27/145; G03B 21/2013; G03B 21/204; G03B 21/2066; G03B 21/208
  See application file for complete search history.

(56) References Cited

U.S. PATENT DOCUMENTS

| | | | | |
|---|---|---|---|---|
| 11,126,073 | B2 * | 9/2021 | Jao ..................... | G03B 21/2013 |
| 2013/0278902 | A1 * | 10/2013 | Chen .................. | G03B 21/2066 |
| | | | | 353/31 |
| 2013/0329755 | A1 | 12/2013 | Arntsen et al. | |
| 2018/0173087 | A1 * | 6/2018 | Hsieh ................ | G03B 21/2033 |
| 2019/0346753 | A1 * | 11/2019 | Pan ..................... | H04N 9/3102 |

(Continued)

FOREIGN PATENT DOCUMENTS

| CN | 109459906 | 3/2019 |
|---|---|---|
| CN | 109557750 | 4/2019 |
| CN | 209265161 | 8/2019 |

*Primary Examiner* — Magda Cruz
(74) *Attorney, Agent, or Firm* — JCIPRNET

(57) ABSTRACT

An illumination system, including a first light source for providing a first beam; a second light source for providing a second beam; a wavelength conversion element having a reflection region and a conversion region, wherein the reflection region is for reflecting the first beam and the conversion region is for converting the first beam into a third beam; a first light splitting element for allowing the second beam to pass; a second light splitting element for reflecting the first beam penetrated by the first light splitting element and allowing the second beam to pass, wherein the first light splitting element is disposed between the wavelength conversion element and the second light splitting element; and a light homogenizing element for receiving the first beam, the second beam, and the third beam, and generating an illumination beam, is provided. A projection apparatus including the illumination system is also provided.

18 Claims, 6 Drawing Sheets

(56) References Cited

U.S. PATENT DOCUMENTS

| 2019/0353995 | A1* | 11/2019 | Pan | H04N 9/3155 |
| 2019/0369470 | A1* | 12/2019 | Yang | G02B 27/141 |
| 2020/0019049 | A1* | 1/2020 | Liu | G03B 21/204 |
| 2022/0197126 | A1* | 6/2022 | Hu | G03B 21/204 |

* cited by examiner

ILLUMINATION SYSTEM AND PROJECTION APPARATUS

CROSS-REFERENCE TO RELATED APPLICATION

This application claims the priority benefit of China application serial no. 202020157627.9, filed on Feb. 10, 2020. The entirety of the above-mentioned patent application is hereby incorporated by reference herein and made a part of this specification.

BACKGROUND OF THE INVENTION

1. Field of the Invention

The disclosure relates to an optical system and an electronic device, and in particular, to an illumination system and a projection apparatus.

2. Description of Related Art

A projection apparatus is a display apparatus for generating a large-sized picture. With the evolution and innovation of science and technology, the projection apparatus has been continuously improved. An imaging principle of the projection apparatus is to convert an illumination beam generated by an illumination system into an image beam via a light valve, and then project the image beam onto a projection target object (for example, a screen or a wall face) through a projection lens, to form a projection picture.

In addition, the illumination system also evolves from an ultra-high-performance lamps (a UHP lamp) and a light-emitting diode (LED) to the currently most advanced laser diode (LD) light source according to the market requirements for brightness, color saturation, service life, non-toxic and environmental protection of the projection apparatus. However, in a current optical path architecture, a transmission path of blue light should have additional loops, which may cause it difficult to reduce a volume of a light combining system. In addition, other colored light is mainly a laser generated after phosphor is excited by excitation light, and then filtered out by a filtering wheel (a color wheel). Therefore, coordinates of other light colors are limited by the type of phosphor, and efficiency is not high, which causes blue light with higher energy to easily generate greater and non-uniform energy.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The disclosure provides an illumination system and a projection apparatus, so that the uniformity of beams incident on a light homogenizing element may be improved, and in comparison to a traditional optical path, occupied space may be effectively reduced.

Other objectives and advantages of the disclosure may be further known from technical features disclosed in the disclosure.

In order to achieve one or a part or all of the foregoing objectives or other objectives, the disclosure provides an illumination system including a first light source, a second light source, a wavelength conversion element, a first light splitting element, a second light splitting element, and a light homogenizing element. The first light source is configured to provide a first beam. The second light source is configured to provide a second beam. The wavelength conversion element has a reflection region and a conversion region, where the reflection region is configured to reflect the first beam, and the conversion region is configured to convert the first beam into a third beam. The first light splitting element is configured to allow the second beam to pass, and includes a first region, a second region, and a third region. The first region is configured to allow the first beam to pass. The second region is configured to reflect the first beam from the reflection region. The third region is configured to allow the first beam from the reflection region to pass. The second light splitting element is configured to reflect the first beam penetrated by the first light splitting element and allow the second beam to pass, where the first light splitting element is disposed between the wavelength conversion element and the second light splitting element. The light homogenizing element is configured to receive the first beam, the second beam, and the third beam, and generate an illumination beam.

In order to achieve one or a part or all of the foregoing objectives or other objectives, the disclosure further provides a projection apparatus including an illumination system, at least one light valve, and a projection lens. The illumination system is configured to provide an illumination beam. The illumination system includes a first light source, a second light source, a wavelength conversion element, a first light splitting element, a second light splitting element, and a light homogenizing element. The first light source is configured to provide a first beam. The second light source is configured to provide a second beam. The wavelength conversion element has a reflection region and a conversion region, where the reflection region is configured to reflect the first beam, and the conversion region is configured to convert the first beam into a third beam. The first light splitting element is configured to allow the second beam to pass, and includes a first region, a second region, and a third region. The first region is configured to allow the first beam to pass. The second region is configured to reflect the first beam from the reflection region. The third region is configured to allow the first beam from the reflection region to pass. The second light splitting element is configured to reflect the first beam penetrated by the first light splitting element and allow the second beam to pass, where the first light splitting element is disposed between the wavelength conversion element and the second light splitting element. The light homogenizing element is configured to receive the first beam, the second beam, and the third beam, and generate an illumination beam. The at least one light valve is disposed on a transmission path of the illumination beam, and is configured to convert the illumination beam into an image beam. The projection lens is disposed on a transmission path of the image beam, and is configured to project the image beam out of the projection apparatus.

Based on the foregoing, the embodiments of the disclosure have at least one of the following advantages or effects. In the illumination system and the projection apparatus of the disclosure, the second light source may pass through the first light splitting element and the second light splitting element simultaneously, so as to increase brightness of the illumination beam and reduce usage space. In addition, the first beam splitting element includes a first region, a second region, and a third region. The first beam is transmitted to the wavelength conversion element through the first region in an off-axis manner, and the first beam reflected by the wavelength conversion element is transmitted to the second region and the third region in a manner symmetrical to the central axis of the wavelength conversion element, where a position of the first beam reflected to the light homogenizing element by passing through the second region is different from a position of the first beam reflected to the light homogenizing element via the second light splitting element by passing through the third region. In this way, the uniformity of the first beam incident on the light homogenizing element may be improved, and in comparison to a traditional optical path, occupied space may be effectively reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
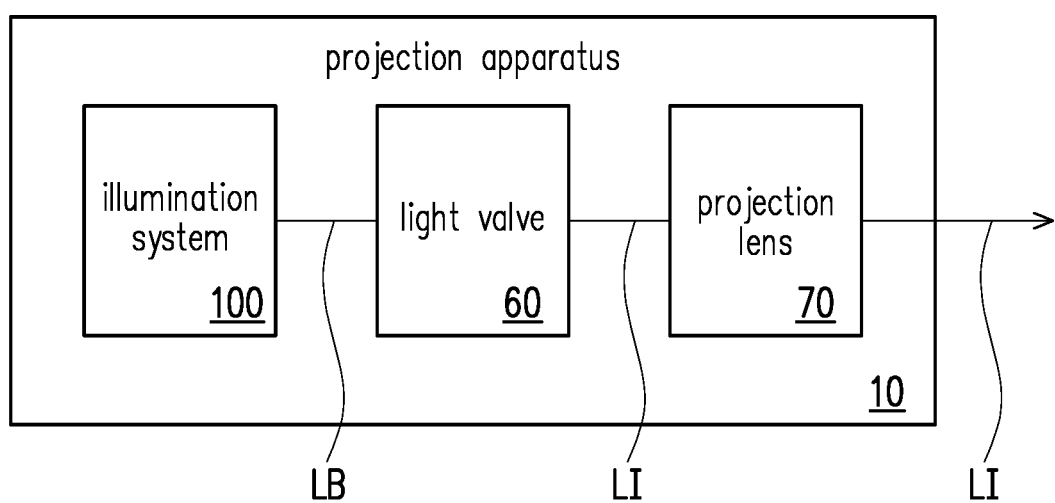
FIG. 1 is a schematic diagram of a projection apparatus according to an embodiment of the disclosure.

FIG. 1 is a schematic diagram of a projection apparatus according to an embodiment of the disclosure. Referring to FIG. 1, the present embodiment provides a projection apparatus 10 including an illumination system 100, at least one light valve 60, and a projection lens 70. The illumination system 100 is configured to provide an illumination beam LB. The at least one light valve 60 is disposed on a transmission path of the illumination beam LB, and is configured to convert the illumination beam LB into an image beam LI. The projection lens 70 is disposed on a transmission path of the image beam LI, and is configured to project the image beam LI out of the projection apparatus 10 to a projection target (not shown), for example, a screen or a wall face.

The illumination system 100 is configured to provide the illumination beam LB. For example, in the present embodiment, the illumination system 100 includes, for example, a plurality of light sources, a wavelength conversion element, a light homogenizing element, a filtering element, and a plurality of light splitting and combining elements, to provide light of different wavelengths as a source of image light. Detailed implementations are described in subsequent paragraphs.

In the present embodiment, the light valve 60 is, for example, a reflective light modulator such as a liquid crystal on silicon panel (an LCoS panel) or a digital micro-mirror device (DMD). In some embodiments, the light valve 60 may also be a penetrated optical modulator such as a transparent liquid crystal panel, an electro-optical modulator, a magneto-optic modulator, and an acousto-optic modulator (AOM). The disclosure does not limit the form and category of the light valve 60. For detailed steps and implementations of converting the illumination beam LB into the image beam LI by the light valve 60, adequate instructions, advices, and implementation descriptions may be obtained from general knowledge in the art, and the descriptions thereof are omitted herein. In the present embodiment, there is only one light valve 60, for example, the projection apparatus 10 with a single digital micro-mirror element is used, but in other embodiments, there may be a plurality of light valves, and the disclosure is not limited thereto.

The projection lens 70 includes, for example, a combination of one or more optical dioptric lenses, for example, includes various combinations of non-planar lenses such as a biconcave lens, a biconvex lens, a meniscus lens, a convex-concave lens, a plano-convex lens, and a plano-concave lens. In one embodiment, the projection lens 70 may further include a flat optical lens, which projects the image beam LI from the light valve 60 to the projection target in a reflective manner. The disclosure does not limit a form and a category of the projection lens 70.

Figure 2A:
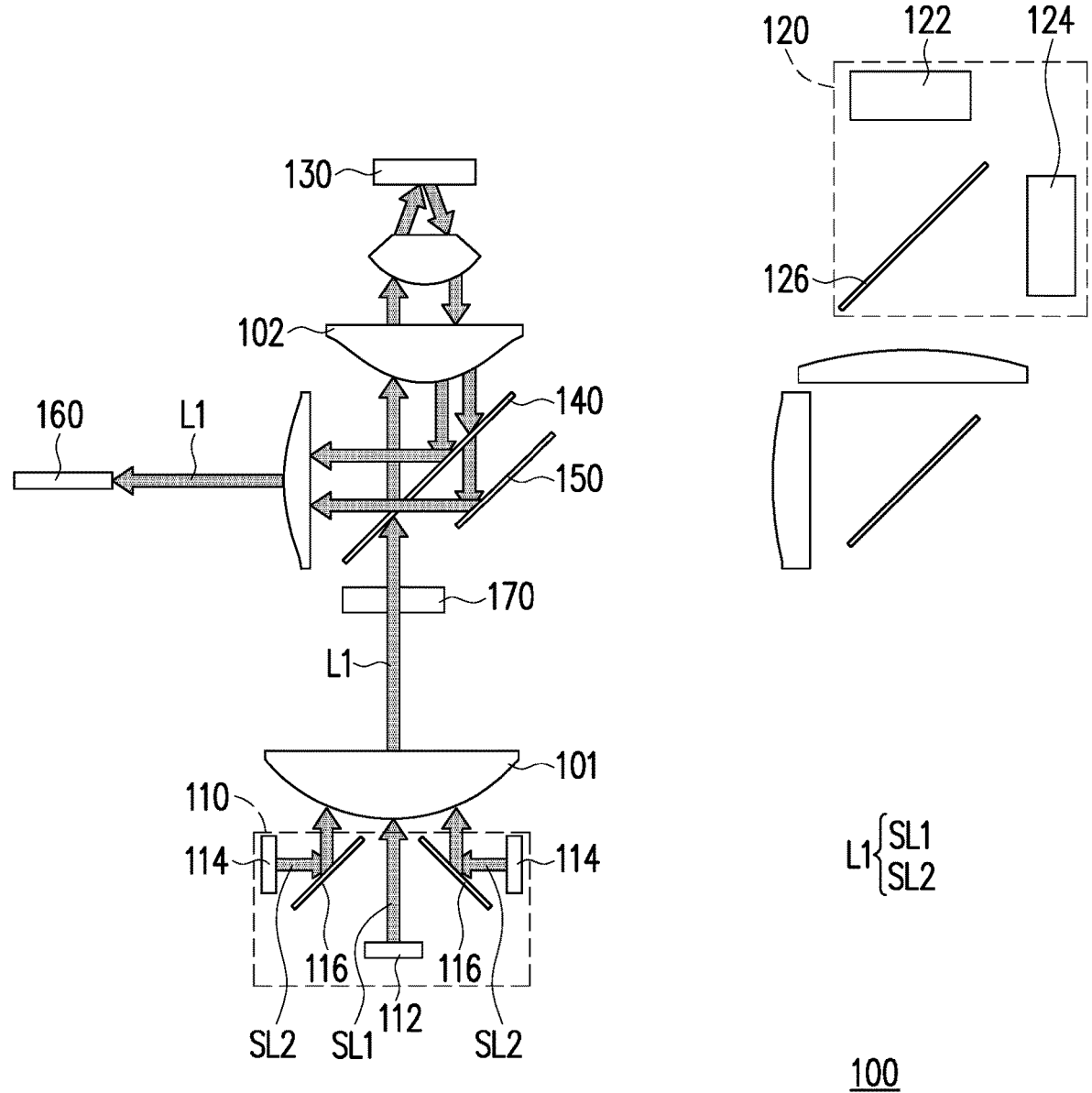
FIG. 2A to FIG. 2C are each a schematic diagram of different optical paths of an illumination system according to an embodiment of the disclosure.
Figure 2B:
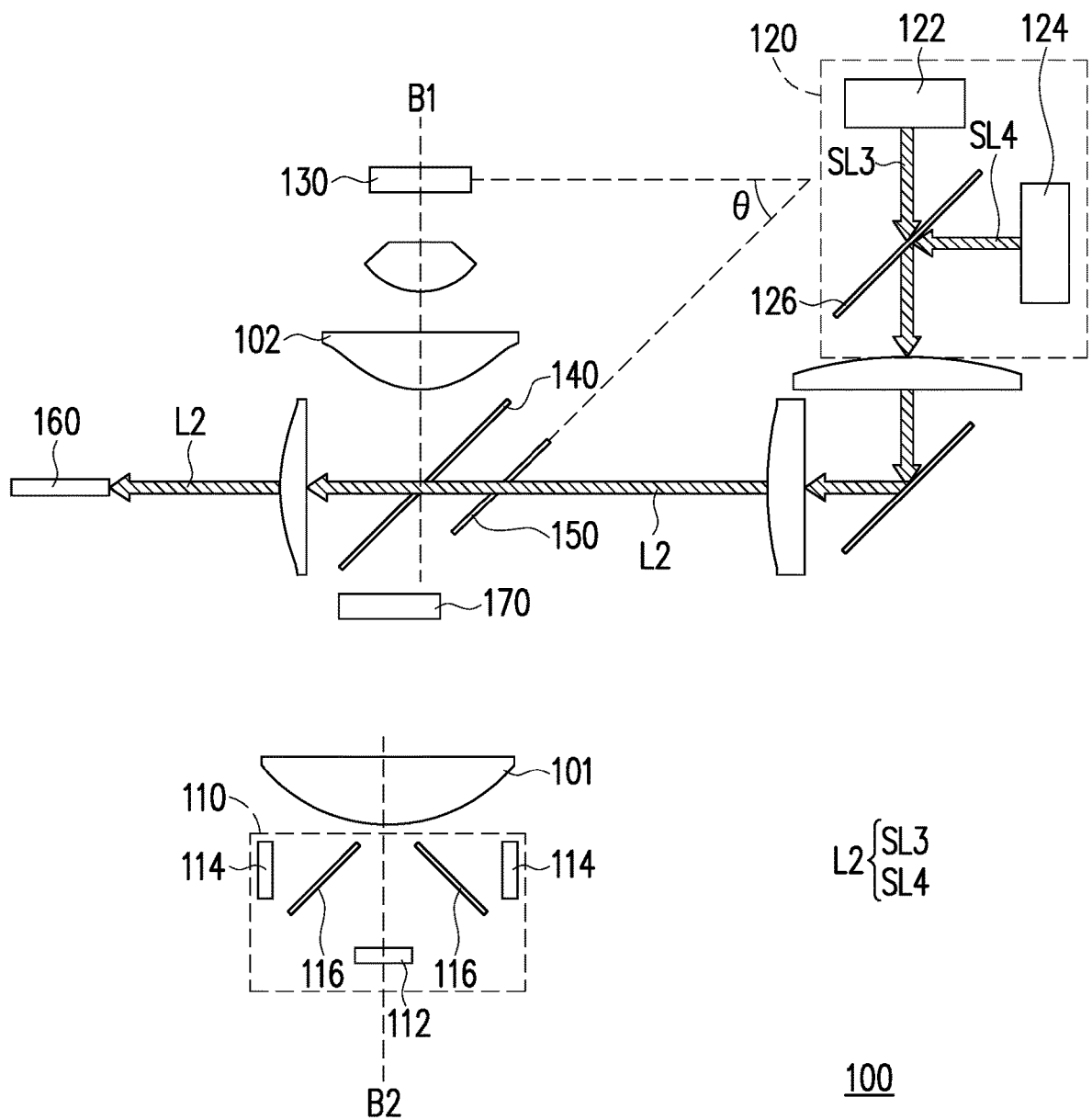
Figure 2C:
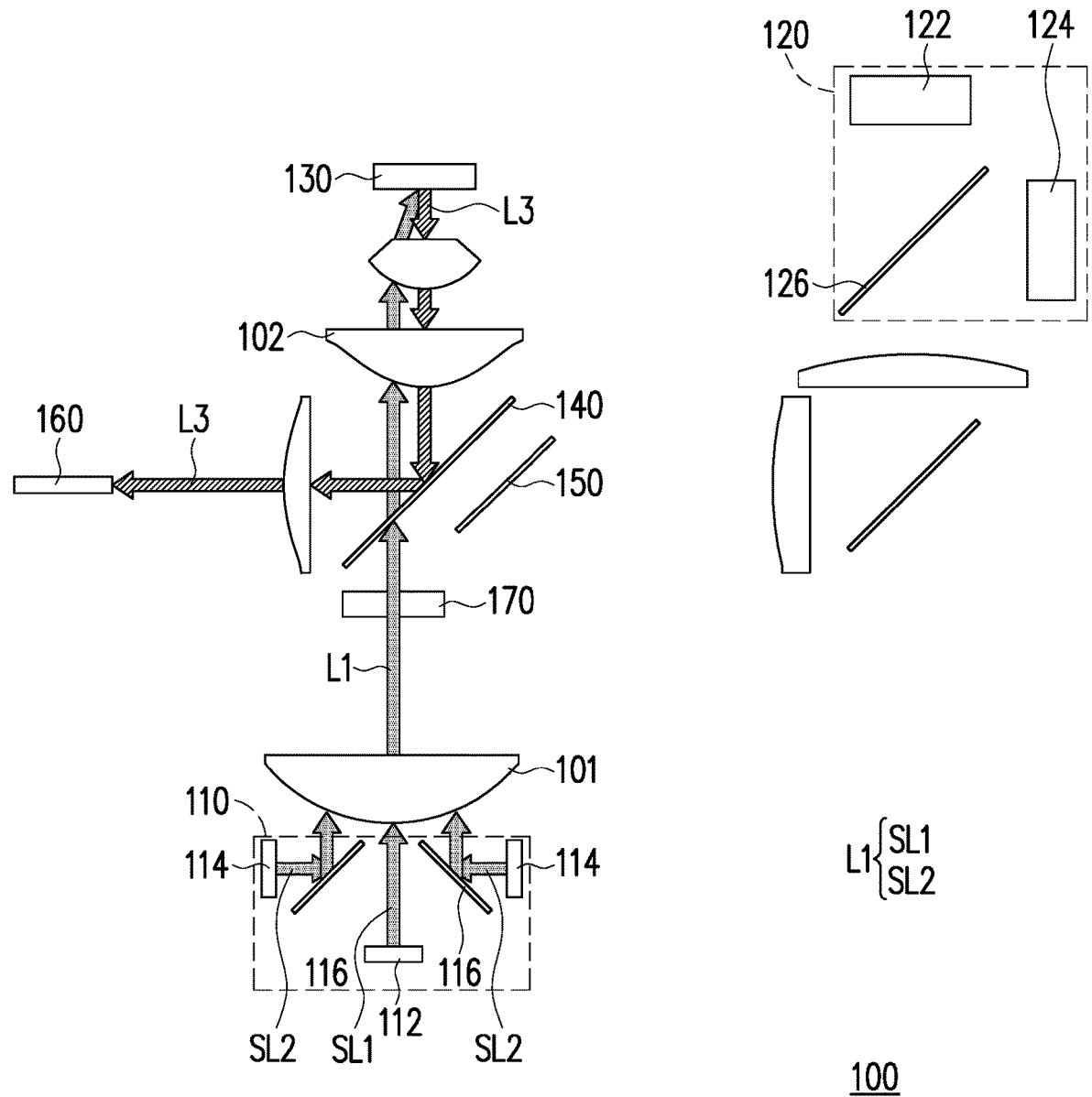

FIG. 2A to FIG. 2C are each a schematic diagram of different optical paths of an illumination system according to an embodiment of the disclosure. Referring to FIG. 1 to FIG. 2C, in the present embodiment, an illumination system 100 includes a first light source 110, a second light source 120, a wavelength conversion element 130, a first light splitting element 140, a second light splitting element 150, and a light homogenizing element 160. The first light source 110 is configured to provide a first beam L1. The second light source 120 is configured to provide a second beam L2. For example, in the present embodiment, the first light source 110 includes, for example, a plurality of blue-light composite laser (multi-chip laser, MCL) modules, and the second light source 120 includes, for example, a plurality of red-light composite laser modules, where the quantity of laser modules included in the first light source 110 and the second light source 120 may be different or the same, and the disclosure is not limited thereto. In some embodiments, the second light source 120 may also be selected as the plurality of blue-light composite laser modules, for example, a wavelength of the second beam L2 differs from a wavelength of the first beam L1 by 50 nm, and the disclosure is not limited thereto.

The wavelength conversion element 130 has a reflection region and a conversion region, and is disposed on a transmission path of the first beam L1. Specifically, the reflection region of the wavelength conversion element 130 has, for example, a reflective material coating configured to reflect the first beam L1. The conversion region of the wavelength conversion element 130 has a wavelength conversion material, for example, a phosphor material, configured to convert the first beam L1 into a third beam L3 (for example, yellow light or green light), as shown in FIG. 2C.

The first light splitting element 140 is disposed on transmission paths of the first beam L1 and the second beam L2, and is located between the first light source 110 and the wavelength conversion element 130. The first light splitting element 140 is configured to allow the second beam L2 to pass. In the present embodiment, the first light splitting element 140 is a composite dichroic mirror with green orange reflection (DMGO). In other words, the first light splitting element 140 has different light splitting effects at different positions.

The second light splitting element 150 is disposed on a transmission path of the second beam L2, and is located between the first light source 110 and the wavelength conversion element 130. However, the first light splitting element 140 is disposed between the wavelength conversion element 130 and the second light splitting element 150. The second light splitting element 150 is configured to reflect the first beam L1 penetrated by the first light splitting element 140 and allow the second beam L2 to pass. In the present embodiment, the second light splitting element 150 is a composite dichroic mirror with blue reflection and red transmission (DMBRT).

In the present embodiment, the wavelength conversion element 130 has a central axis B1 (as shown in FIG. 2B), and the first light splitting element 140 and the second light splitting element 150 are inclined to the central axis B1 of the wavelength conversion element 130. In the present embodiment, the central axis B1 of the wavelength conversion element 130 does not intersect the second light splitting element 150. Specifically, the illumination system 100 of the present embodiment conforms to R/(2 Cos θ), where R is a beam diameter of the beam (that is, the first beam L1) emitted from the wavelength conversion element 130, and θ is an angle of inclination of the second light splitting element 150 relative to the wavelength conversion element 130 (as shown in FIG. 2B). In the present embodiment, the first light splitting element 140 may be parallel to the second light splitting element 150.

The light homogenizing element 160 is disposed on transmission paths of the first beam L1, the second beam L2, and the third beam L3, and is configured to receive the first beam L1, the second beam L2, and the third beam L3, and generate an illumination beam LB. The light homogenizing element 160 is configured to adjust light spot shapes of the beams, so that light spot shapes of the transmitted illumination beam LB can match a shape (for example, a rectangular shape) of the working area of the light valve 60, all positions of the light spots have consistent or approximate light intensity, and light intensity of the illumination beam LB is uniform. In the present embodiment, the light homogenizing element 160 is, for example, an integration rod, but in other embodiments, the light homogenizing element 160 may also be other appropriate type of optical elements, for example, a fly-eye lens array, and the disclosure is not limited thereto.

In the present embodiment, the illumination system 100 may further selectively include a plurality of optical elements such as an optical lens, a beam splitter, or a reflector, which are configured to guide beams emitted by the first light source 110, the second light source 120, and the wavelength conversion element 130 to the light homogenizing element 160, but the disclosure is not limited thereto. In addition, in the present embodiment, the foregoing optical element nay also be used to guide the illumination beam LB from the light homogenizing element 160 to the light valve 60, and the disclosure is not limited thereto.

Figure 3:
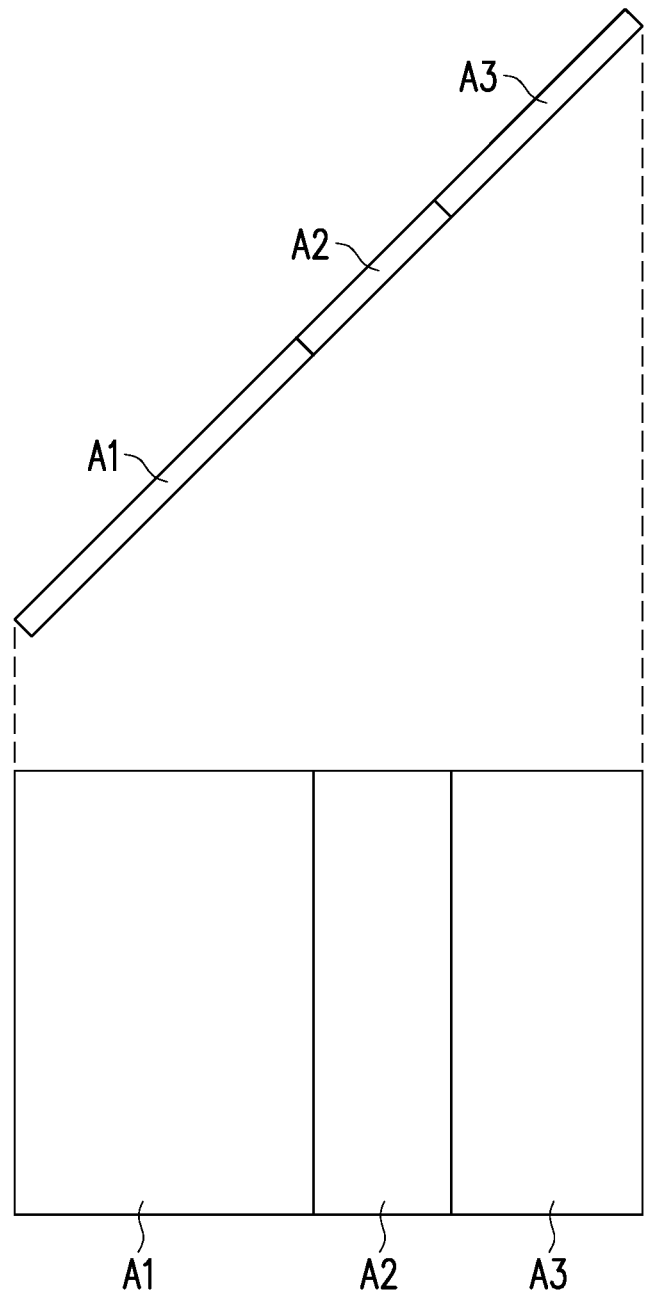
FIG. 3 is a schematic diagram of a first light splitting element in the illumination system of FIG. 2A.

FIG. 3 is a schematic diagram of a first light splitting element in the illumination system of FIG. 2A. Referring to FIG. 2A to FIG. 3, Specifically, a first light splitting element 140 includes a first region A1, a second region A2, and a third region A3, and the first light splitting element 140 is divided into two halves by a central axis B1 of a wavelength conversion element 130. The first region A1 is distributed in one half that is of the first light splitting element 140 and that is adjacent to a light homogenizing element 160, and the second region A2 and the third region A3 are distributed in the other half away from the light homogenizing element 160. In the present embodiment, a width of the second region A2 of the first light splitting element 140 is between 20% and 30% of an entire width of the first light splitting element 140, but the disclosure is not limited thereto.

The first region A1 is configured to allow the first beam L1 to pass, and accordingly, the first beam L1 emitted by a first light source 110 may be transmitted through the first region A1 of the first light splitting element 140 and is transmitted to the wavelength conversion element 130 in an off-axis manner. In other words, a central axis B2 of the first light source 110 and the central axis B1 of the wavelength conversion element 130 do not overlap (as shown in FIG. 2B). Therefore, positions of a lens 101 adjacent to the first light source 110 and a lens 102 adjacent to the wavelength conversion element 130 in the illumination system 100 are staggered, as shown in FIG. 2A.

When the first beam L1 is transmitted to a reflection region of the wavelength conversion element 130 through the first region A1 of the first beam splitting element 140, the wavelength conversion element 130 reflects the first beam L1 and is transmitted to the second region A2 and the third region A3 of the first light splitting element 140 in a manner symmetrical to the central axis B1 of the wavelength conversion element 130. The first beam L1 transmitted to the second region A2 of the first light splitting element 140 is transmitted to the light homogenizing element 160 through reflection of the second region A2, and the first beam L1 transmitted to the third region A3 of the first light splitting element 140 is transmitted to the second light splitting element 150 through the third region A3. The first beam L1 transmitted to the second light splitting element 150 is transmitted to the light homogenizing element 160 through the first region A1 of the first light splitting element 140 via reflection of the second light splitting element 150.

In other words, in the first beam splitting element 140, the first region A1 and the third region A3 are configured to allow the first beam L1 to pass, and the second region A2 is configured to reflect the first beam L1 from the reflection region of the wavelength conversion element 130. That is, a part of the first beam L1 reflected from the wavelength conversion element 130 is sequentially transmitted through the third region A3 of the first light splitting element 140, the second light splitting element 150, and the first region A1 of the first light splitting element 140. Therefore, the first beam L1 reflected through the reflection region of the wavelength conversion element 130 may be formed into two parts via the design of the first light splitting element 140 and the second light splitting element 150, and the two parts enter the light homogenizing element 160 from different positions (or a symmetrical position relative to the center of the light homogenizing element 160). In this way, the uniformity of the first beam L1 incident on the light homogenizing element 160 may be improved, and in comparison to a traditional optical path, occupied space may be effectively reduced.

When the first beam L1 is transmitted to the conversion region of the wavelength conversion element 130, the wavelength conversion element 130 converts the first beam L1 into a third beam L3 (as shown in FIG. 2C), and the third beam L3 is transmitted to the light homogenizing element 160 through the reflection of the first light splitting element 140. Specifically, the first region A1, the second region A2, and the third region A3 of the first light splitting element 140 all reflect the third beam L3.

On the other hand, the second beam L2 is sequentially transmitted by the second light source 120 through the second light splitting element 150, the first light splitting element 140, and the light homogenizing element 160 (as shown in FIG. 2B). Therefore, in the configuration of the present embodiment, the second beam L2 will not be transmitted through the wavelength conversion element 130. In this way, the usage efficiency of the second beam L2 may be improved, and the brightness of the illumination beam LB may be increased. In the present embodiment, a dichroic mirror with red reflect (DMR) may be additionally disposed on the transmission path of the second beam L2, to further adjust the transmission path of the second beam L2, but the disclosure is not limited thereto.

In addition, it should be noted that, in the present embodiment, the first light source 110 includes a first light-emitting element 112, two second light-emitting elements 114, and two reflective elements 116. The first light-emitting element 112 is configured to provide a first sub-beam SL1, the two second light-emitting elements 114 are configured to provide two second sub-beams SL2, and the two reflective elements 116 are configured to reflect the two second sub-beams SL2, respectively. The reflective element 116 is, for example, a reflector or a beam splitter having a function of reflecting blue light, and the disclosure is not limited thereto. In the present embodiment, a shortest distance between the two reflective elements 116 is greater than a beam diameter of the first sub-beam SL1. In this way, the uniformity of the first beam L1 may be further improved, and the light source density per unit area may be improved.

Figure 4:
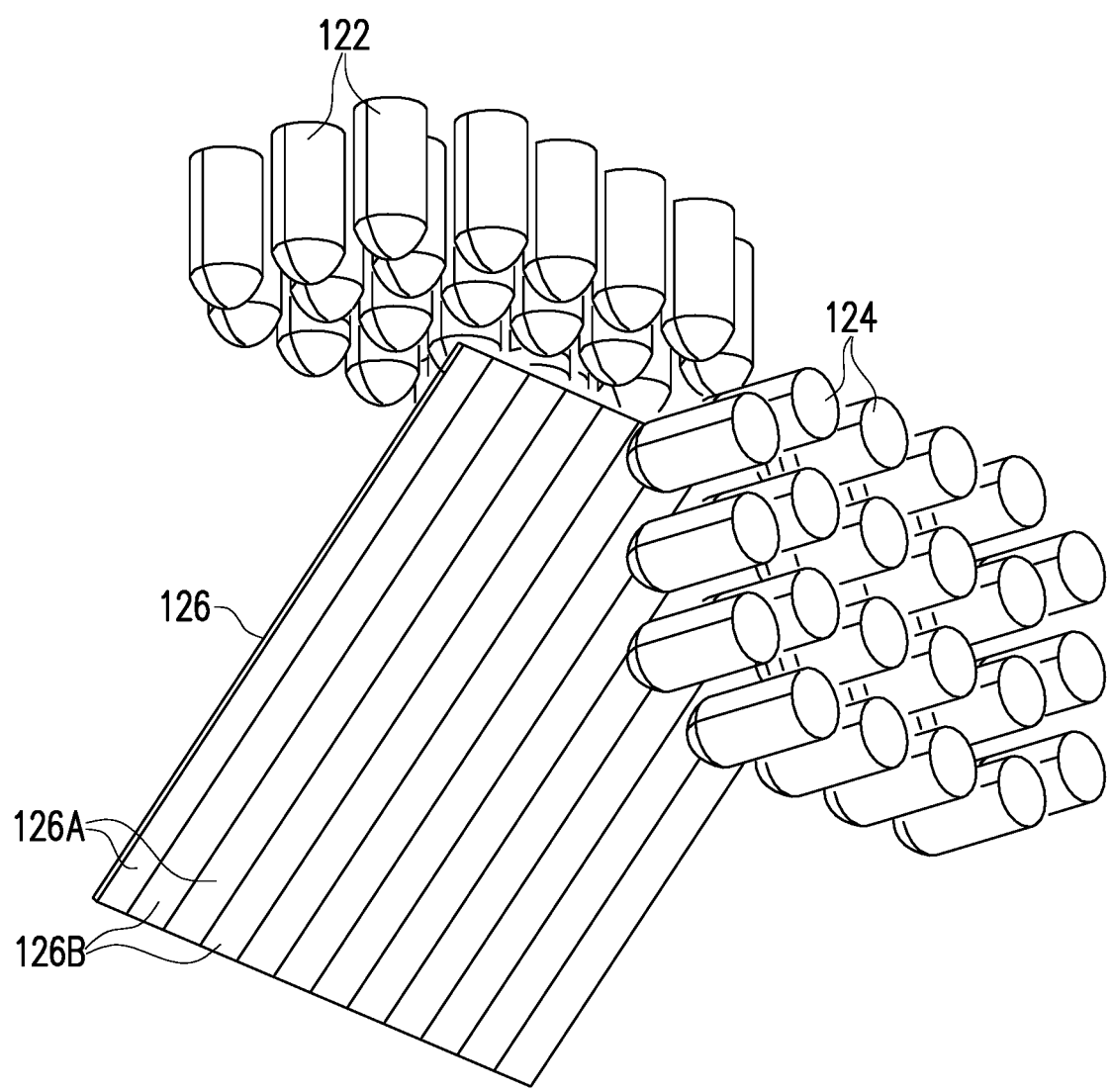
FIG. 4 is an enlarged schematic three-dimensional view of a part of the illumination system of FIG. 2B.

FIG. 4 is an enlarged schematic three-dimensional view of a part of the illumination system of FIG. 2B. Referring to FIG. 2B and FIG. 4, in addition, a second light source 120 includes a plurality of third light-emitting elements 122, a plurality of fourth light-emitting elements 124, and a light combining element 126. The plurality of third light-emitting elements 122 are configured to provide a plurality of third sub-beams SL3, the plurality of fourth light-emitting elements 124 are configured to provide a plurality of fourth sub-beams SL4, and the light combining element 126 is configured to allow the plurality of third sub-beams SL3 to pass and reflect the plurality of fourth sub-beams SL4, so that the plurality of third sub-beams SL3 and the plurality of fourth sub-beams SL4 are transmitted toward a same direction. Specifically, the light combining element 126 includes a first part 126A and a second part 126B that are continuously staggered, where the first part 126A is configured to allow the plurality of third sub-beams SL3 to pass, and the second part 126B is configured to reflect the plurality of fourth sub-beams SL4. The light combining element 126 is, for example, a stripe mirror. In other words, the plurality of third sub-beams SL3 provided by the plurality of third light-emitting elements 122 do not intersect the plurality of fourth sub-beams SL4 provided by the plurality of fourth light-emitting elements 124. In this way, the brightness and imaging uniformity of the second beam L2 may be further improved.

Referring to FIG. 2A, in the present embodiment, the illumination system may further include a diffusive element 170 disposed between the first light source 110 and the first light splitting element 140 and configured to homogenize energy distribution of the first beam L1. The diffusive element 170 is, for example, a fly-eye lens, but the disclosure is not limited thereto.

Based on the above, the embodiments of the disclosure have at least one of the following advantages or effects. In the illumination system and the projection apparatus of the disclosure, the second light source may penetrate the first light splitting element and the second light splitting element simultaneously, so as to increase brightness of the illumination beam and reduce usage space. In addition, the first beam splitting element includes a first region, a second region, and a third region. The first beam is transmitted to the wavelength conversion element through the first region in an off-axis manner, and the first beam reflected by the wavelength conversion element is transmitted to the second region and the third region in a manner symmetrical to the central axis of the wavelength conversion element, where a position in which a part of the first beam is reflected to the light homogenizing element by passing through the second region is different from a position in which a part of the first beam is reflected to the light homogenizing element via the second light splitting element by passing through the third region. In this way, the uniformity of the first beam incident on the light homogenizing element may be improved, and in comparison to a traditional optical path, occupied space may be effectively reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising a first light source, a second light source, a wavelength conversion element, a first light splitting element, a second light splitting element, and a light homogenizing element, wherein
    the first light source is configured to provide a first beam;
    the second light source is configured to provide a second beam;
    the wavelength conversion element includes a reflection region and a conversion region, wherein the reflection region is configured to reflect the first beam and the conversion region is configured to convert the first beam into a third beam;
    the first light splitting element is configured to allow the second beam to pass and comprises a first region, a second region, and a third region, wherein
        the first region is configured to allow the first beam to pass;
        the second region is configured to reflect the first beam from the reflection region; and
        the third region is configured to allow the first beam from the reflection region to pass;
    the second light splitting element is configured to reflect the first beam penetrated by the first light splitting element and allow the second beam to pass, wherein the first light splitting element is disposed between the wavelength conversion element and the second light splitting element; and
    the light homogenizing element is configured to receive the first beam, the second beam, and the third beam respectively, and generate an illumination beam,
    wherein the first region is distributed in half of the first light splitting element adjacent to the light homogenizing element, and the second region and the third region are distributed in the other half away from the light homogenizing element.

2. The illumination system according to claim 1, wherein a part of the first beam reflected via the wavelength conversion element is sequentially transmitted through the third region of the first light splitting element, the second light splitting element, and the first region of the first light splitting element.

3. The illumination system according to claim 1, wherein the wavelength conversion element includes a central axis and the central axis does not intersect the second light splitting element.

4. The illumination system according to claim 1, wherein the wavelength conversion element includes a central axis, and the first light splitting element and the second light splitting element are inclined to the central axis.

5. The illumination system according to claim 1, wherein the illumination system further comprises:
    a diffusive element, disposed between the first light source and the first light splitting element, and configured to homogenize an energy distribution of the first beam.

6. The illumination system according to claim 1, wherein a central axis of the first light source and a central axis of the wavelength conversion element do not overlap.

7. A projection apparatus, comprising an illumination system, at least one light valve, and a projection lens, wherein
    the illumination system is configured to provide an illumination beam and comprises a first light source, a second light source, a wavelength conversion element, a first light splitting element, a second light splitting element, and a light homogenizing element, wherein
        the first light source is configured to provide a first beam;
        the second light source is configured to provide a second beam;
        the wavelength conversion element is configured to reflect the first beam or convert the first beam into a third beam;
        the first light splitting element is configured to allow the second beam to pass and comprises a first region, a second region, and a third region, wherein
            the first region is configured to allow the first beam to pass;
            the second region is configured to reflect the first beam from a reflection region; and
            the third region is configured to allow the first beam from the reflection region to pass;
        the second light splitting element is configured to reflect the first beam penetrated by the first light splitting element and allow the second beam to pass, wherein the first light splitting element is disposed between the wavelength conversion element and the second light splitting element; and
        the light homogenizing element is configured to receive the first beam, the second beam, and the third beam respectively, and generate the illumination beam;
    the at least one light valve is disposed on a transmission path of the illumination beam and is configured to convert the illumination beam into an image beam; and
    the projection lens is disposed on a transmission path of the image beam, and is configured to project the image beam out of the projection apparatus,
    wherein the first region is distributed in half of the first light splitting element adjacent to the light homogenizing element, and the second region and the third region are distributed in the other half away from the light homogenizing element.

8. The projection apparatus according to claim 7, wherein a part of the first beam reflected via the wavelength conversion element is sequentially transmitted through the third region of the first light splitting element, the second light splitting element, and the first region of the first light splitting element.

9. The projection apparatus according to claim 7, wherein the wavelength conversion element includes a central axis and the central axis does not intersect the second light splitting element.

10. The projection apparatus according to claim 7, wherein the wavelength conversion element includes a central axis, and the first light splitting element and the second light splitting element are inclined to the central axis.

11. The projection apparatus according to claim 7, wherein a width of the second region of the first light splitting element is between 20% and 30% of a width of the first light splitting element.

12. The projection apparatus according to claim 7, wherein the first light source comprises a first light-emitting element, two second light-emitting elements, and two reflective elements, the first light-emitting element is configured to provide a first sub-beam, the two second light-emitting elements are configured to provide two second sub-beams, the two reflective elements are configured to respectively reflect the two second sub-beams, and a shortest distance between the two reflective elements is greater than a beam diameter of the first sub-beam.

13. The projection apparatus according to claim 7, wherein the second light source comprises a plurality of third light-emitting elements, a plurality of fourth light-emitting elements, and a light combining element, the plurality of third light-emitting elements is configured to provide a plurality of third sub-beams, the plurality of fourth light-emitting elements is configured to provide a plurality of fourth sub-beams, and the light combining element is configured to allow the plurality of third sub-beams to pass and reflect the plurality of fourth sub-beams, so that the plurality of third sub-beams and the plurality of fourth sub-beams are transmitted toward a same direction.

14. The projection apparatus according to claim 7, wherein the illumination system further comprises a diffusive element, disposed between the first light source and the first light splitting element, and configured to homogenize an energy distribution of the first beam.

15. The projection apparatus according to claim 7, wherein a central axis of the first light source and a central axis of the wavelength conversion element do not overlap.

16. An illumination system, comprising a first light source, a second light source, a wavelength conversion element, a first light splitting element, a second light splitting element, and a light homogenizing element, wherein
the first light source is configured to provide a first beam;
the second light source is configured to provide a second beam;
the wavelength conversion element includes a reflection region and a conversion region, wherein the reflection region is configured to reflect the first beam and the conversion region is configured to convert the first beam into a third beam;
the first light splitting element is configured to allow the second beam to pass and comprises a first region, a second region, and a third region, wherein
the first region is configured to allow the first beam to pass;
the second region is configured to reflect the first beam from the reflection region; and
the third region is configured to allow the first beam from the reflection region to pass;
the second light splitting element is configured to reflect the first beam penetrated by the first light splitting element and allow the second beam to pass, wherein the first light splitting element is disposed between the wavelength conversion element and the second light splitting element; and
the light homogenizing element is configured to receive the first beam, the second beam, and the third beam respectively, and generate an illumination beam,
wherein a width of the second region of the first light splitting element is between 20% and 30% of a width of the first light splitting element.

17. An illumination system, comprising a first light source, a second light source, a wavelength conversion element, a first light splitting element, a second light splitting element, and a light homogenizing element, wherein
the first light source is configured to provide a first beam;
the second light source is configured to provide a second beam;
the wavelength conversion element includes a reflection region and a conversion region, wherein the reflection region is configured to reflect the first beam and the conversion region is configured to convert the first beam into a third beam;
the first light splitting element is configured to allow the second beam to pass and comprises a first region, a second region, and a third region, wherein
the first region is configured to allow the first beam to pass;
the second region is configured to reflect the first beam from the reflection region; and
the third region is configured to allow the first beam from the reflection region to pass;
the second light splitting element is configured to reflect the first beam penetrated by the first light splitting element and allow the second beam to pass, wherein the first light splitting element is disposed between the wavelength conversion element and the second light splitting element; and
the light homogenizing element is configured to receive the first beam, the second beam, and the third beam respectively, and generate an illumination beam,
wherein the first light source comprises a first light-emitting element, two second light-emitting elements, and two reflective elements, the first light-emitting element is configured to provide a first sub-beam, the two second light-emitting elements are configured to provide two second sub-beams, the two reflective elements are configured to respectively reflect the two second sub-beams, and a shortest distance between the two reflective elements is greater than a beam diameter of the first sub-beam.

18. An illumination system, comprising a first light source, a second light source, a wavelength conversion element, a first light splitting element, a second light splitting element, and a light homogenizing element, wherein
the first light source is configured to provide a first beam;
the second light source is configured to provide a second beam;
the wavelength conversion element includes a reflection region and a conversion region, wherein the reflection region is configured to reflect the first beam and the conversion region is configured to convert the first beam into a third beam;

the first light splitting element is configured to allow the second beam to pass and comprises a first region, a second region, and a third region, wherein
the first region is configured to allow the first beam to pass;
the second region is configured to reflect the first beam from the reflection region; and
the third region is configured to allow the first beam from the reflection region to pass;
the second light splitting element is configured to reflect the first beam penetrated by the first light splitting element and allow the second beam to pass, wherein the first light splitting element is disposed between the wavelength conversion element and the second light splitting element; and
the light homogenizing element is configured to receive the first beam, the second beam, and the third beam respectively, and generate an illumination beam,
wherein the second light source comprises a plurality of third light-emitting elements, a plurality of fourth light-emitting elements, and a light combining element, the plurality of third light-emitting elements is configured to provide a plurality of third sub-beams, the plurality of fourth light-emitting elements is configured to provide a plurality of fourth sub-beams, and the light combining element is configured to allow the plurality of third sub-beams to pass and reflect the plurality of fourth sub-beams, so that the plurality of third sub-beams and the plurality of fourth sub-beams are transmitted toward a same direction.

* * * * *